US012386654B1

(12) United States Patent
Govindaraju et al.

(10) Patent No.: US 12,386,654 B1
(45) Date of Patent: Aug. 12, 2025

(54) CRASH RESILIENCE IN SHARED MEMORY PROCESSING SYSTEMS

(71) Applicant: Amazon Technologies, Inc., Seattle, WA (US)

(72) Inventors: Venkatraman Govindaraju, Fremont, CA (US); Pavel Sokolov, Menlo Park, CA (US); Naresh Chainani, Mountain View, CA (US)

(73) Assignee: Amazon Technologies, Inc., Seattle, WA (US)

( * ) Notice: Subject to any disclaimer, the term of this patent is extended or adjusted under 35 U.S.C. 154(b) by 570 days.

(21) Appl. No.: 17/809,873

(22) Filed: Jun. 29, 2022

(51) Int. Cl.
*G06F 9/48* (2006.01)
*G06F 9/50* (2006.01)
*G06F 9/54* (2006.01)

(52) U.S. Cl.
CPC ............. *G06F 9/485* (2013.01); *G06F 9/505* (2013.01); *G06F 9/5072* (2013.01); *G06F 9/5077* (2013.01); *G06F 9/544* (2013.01)

(58) Field of Classification Search
CPC ...................................................... G06F 9/485
See application file for complete search history.

(56) References Cited

U.S. PATENT DOCUMENTS

| 7,219,149 B2 * | 5/2007 | Ofir ........................ H04M 11/06 709/224 |
| 9,218,246 B2 | 12/2015 | Nagesharao et al. |
| 10,542,068 B2 | 1/2020 | Vermeulen et al. |
| 10,866,869 B2 | 12/2020 | Li |
| 11,030,055 B2 | 6/2021 | Gupta et al. |
| 2015/0269111 A1 * | 9/2015 | Bak ..................... G06F 13/1663 711/147 |

\* cited by examiner

*Primary Examiner* — Charlie Sun
(74) *Attorney, Agent, or Firm* — S. Scott Foster; Kowert, Hood, Munyon, Rankin & Goetzel, P.C.

(57) ABSTRACT

Improved crash resilience is implemented in shared memory processing systems. A processing application including a plurality processing groups may be configured, and a processing group including a plurality of processes may allocate memory from a global shared memory to a group-private shared memory arena. Then, an abnormal execution condition for a failing process of the processing group may be detected during execution of a processing job. Responsive to the detection, a recovery of execution of the processing group may be performed while continuing execution of processing groups of the application. The recovery may include restoring the processing group to a normal execution state and returning the allocated memory of the group-private memory arena to the global shared memory.

20 Claims, 8 Drawing Sheets

CRASH RESILIENCE IN SHARED MEMORY PROCESSING SYSTEMS

BACKGROUND

In shared memory data processing systems, crashes in one process or task may force all processes or tasks to be restarted because crashed process may leave the shared state in an inconsistent state. As these data processing systems grow larger, restarting becomes more computationally expensive as well as increasingly common, thus limiting the scale of such systems. To improve scalability in such systems, a means of reducing exposure to corruption of shared memory state is needed.

Figure 1:
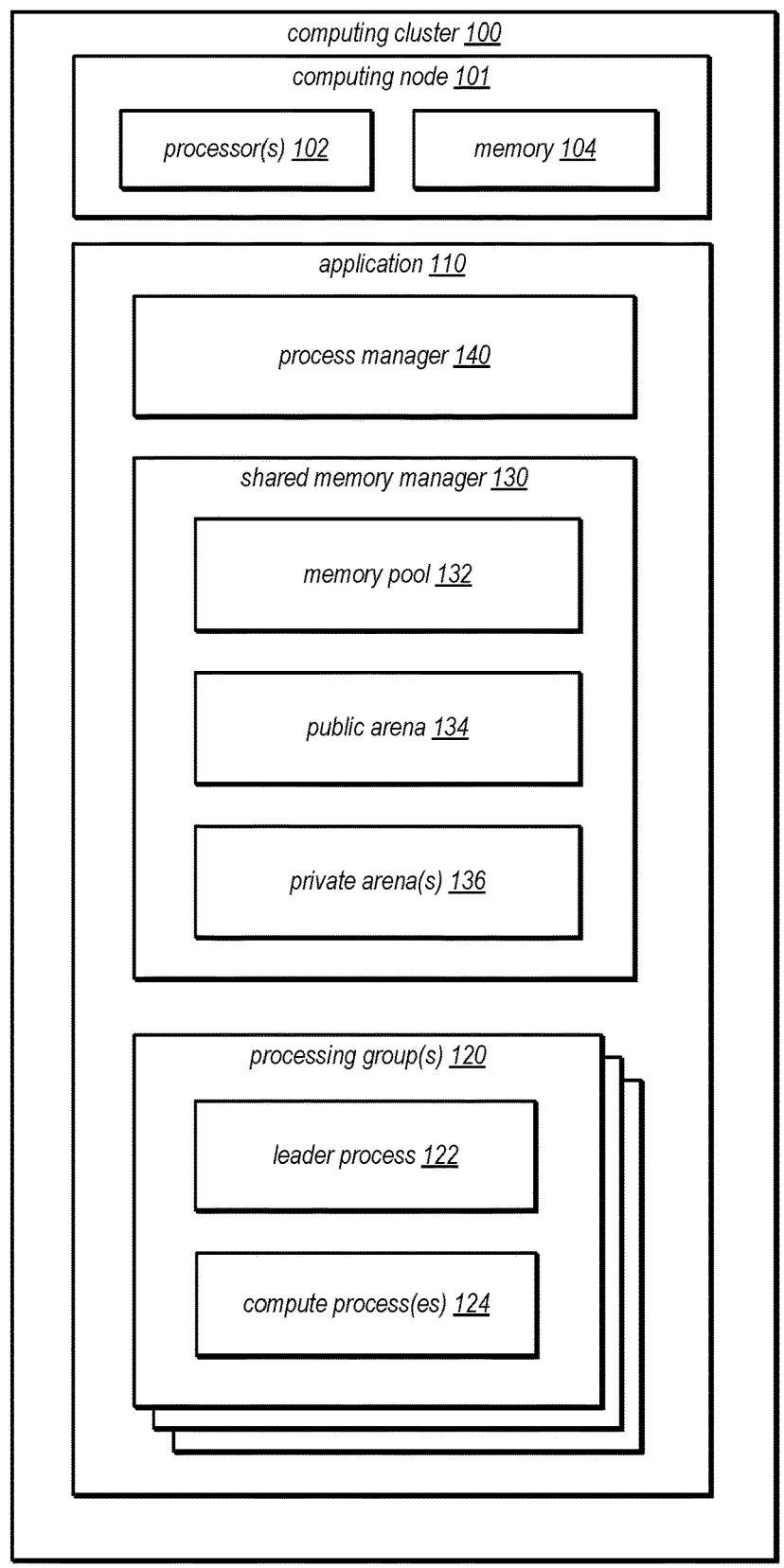
FIG. 1 illustrates a logical block diagram of a processing system implementing improved crash resilience in shared memory processing systems, according to some embodiments.

While embodiments are described herein by way of example for several embodiments and illustrative drawings, those skilled in the art will recognize that the embodiments are not limited to the embodiments or drawings described. It should be understood that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). The words "include," "including," and "includes" indicate open-ended relationships and therefore mean including, but not limited to. Similarly, the words "have," "having," and "has" also indicate open-ended relationships, and thus mean having, but not limited to. The terms "first," "second," "third," and so forth as used herein are used as labels for nouns that they precede, and do not imply any type of ordering (e.g., spatial, temporal, logical, etc.) unless such an ordering is otherwise explicitly indicated.

"Based On." As used herein, this term is used to describe one or more factors that affect a determination. This term does not foreclose additional factors that may affect a determination. That is, a determination may be solely based on those factors or based, at least in part, on those factors. Consider the phrase "determine A based on B." While B may be a factor that affects the determination of A, such a phrase does not foreclose the determination of A from also being based on C. In other instances, A may be determined based solely on B.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

DETAILED DESCRIPTION

In shared memory data processing systems, crashes of one process or task may force other processes or tasks to be restarted due to an inconsistent state of global shared memory. As the data processing system grows larger, restarting becomes more computationally expensive as well as increasingly common, thus limiting the scale of such systems.

Rather than restart the entire data processing system upon detection of an abnormal execution condition, the misbehaving processing job may instead be canceled or aborted and a processing group assigned to execute the affected job may be restarted, depending on the process demonstrating the abnormal execution condition. This may be performed almost entirely within a signal handler(s) of the affected process or processing group itself. In this way, processing clusters implementing such data processing system may benefit from improved scalability. However, to ensure stability and correctness of the data processing system, shared memory state that has been modified by the affected processing group must be restored. To accomplish this, modifications to shared memory processing may be employed to reduce the impact of shared memory state by processing groups that may exhibit abnormal execution conditions.

Systems and methods for implementing improved crash resilience in shared memory processing systems are described herein. A processing application including a plurality of processing groups may be configured, and a processing group including a plurality of processes may allocate memory from a global shared memory to a group-private shared memory arena. Then, an abnormal execution condition for a failing process of the processing group may be detected during execution of a processing job. Responsive to the detection, a recovery of execution of the processing group may be performed while continuing execution of processing groups of the application. The recovery may include restoring the processing group to a normal execution state and returning the allocated memory of the group-private memory arena to the global shared memory.

FIG. 1 illustrates a logical block diagram of a processing system implementing improved crash resilience in shared memory processing systems, according to some embodiments. A computing cluster 100 of one or more computing nodes 101 may individually include one or more processors 102 and a memory 104 to implement a data processing application 110, in some embodiments. An example of such computing nodes is provided in the computer system embodiment illustrated in FIG. 8 and described below.

The application 110 may include a process manager 140 that may manage a number of processing groups 120 that may execute processing jobs of the application 110. These processing groups 120 may individually include a leader process 122 and optionally one or more compute processes 124, in various embodiments.

The application 110 may further include a shared memory manager 130, in some embodiments. This shared memory may be shared across all processing groups 120 to enable the various processing groups to access and affect changes to global data of the application. For example, the application 110 may implement portions of a database service, as discussed further below in FIG. 2, with the shared memory manager 130 enabling database query processing groups to access and affect changes to various databases, in some embodiments.

The shared memory manager 130 may include a memory pool 132 of shared memory pages, as shown in further detail in FIG. 3 below. In addition, shared memory manager 130 may include a number of shared memory arenas including a public arena 134 and respective private arenas 136 for the respective processing groups 120. By isolating shared memory updates to group-private memory arenas 136 and minimizing updates to the public arena 134, as discussed further in FIGS. 3-8 below, crash resilience in shared memory processing systems may be improved, in various embodiments.

Please note that the previous description of a data processing application is a logical description and thus is not to be construed as limiting as to the implementation of a data processing systems or portions thereof.

This specification continues with a general description of a provider network that implements multiple different services, including a database service and storage service, which may implement detecting idle periods for management actions at processing clusters for managed databases. Then various examples of the database service and storage service, including different components/modules, or arrangements of components/module that may be employed as part of implementing the services are discussed. A number of different methods and techniques to implement detecting idle periods for management actions at processing clusters for managed databases are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
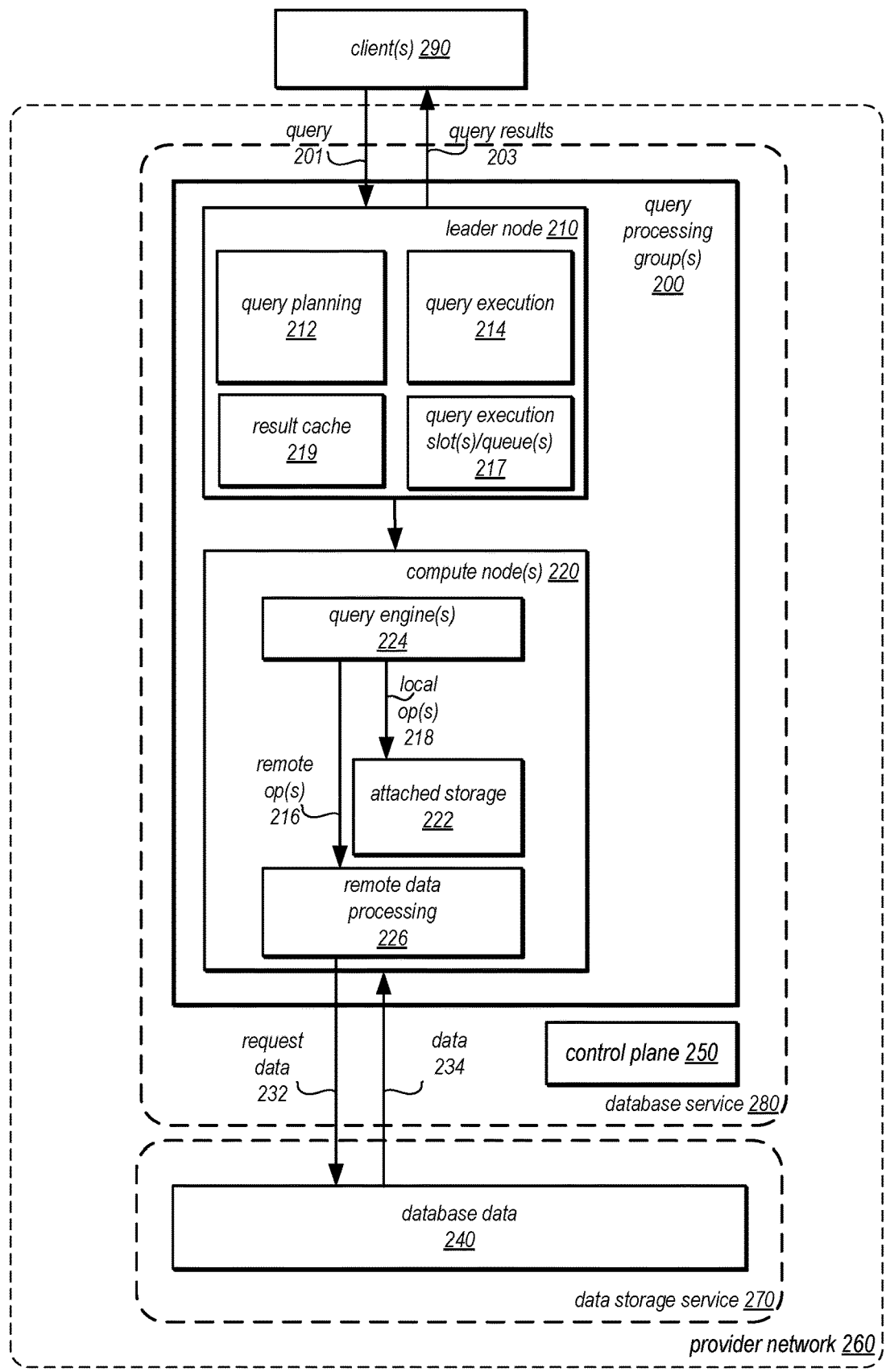
FIG. 2 is a logical block diagram illustrating an example of query processing groups performing queries to database data, according to some embodiments.

FIG. 2 is a logical block diagram illustrating an example of query processing groups performing queries to database data, according to some embodiments. Provider network 260 may be a private or closed system or may be set up by an entity such as a company or a public sector organization to provide one or more services (such as various types of cloud-based storage) accessible via the Internet and/or other networks to clients 290.

Provider network 260 may be implemented in a single location or may include numerous data centers hosting various resource pools, such as collections of physical and/or virtualized computer servers, storage devices, networking equipment and the like (e.g., computing system 1000 described below with regard to FIG. 8), needed to implement and distribute the infrastructure and storage services offered by the provider network 260. The provider network 260 can be formed as a number of regions, where a region is a separate geographical area in which the cloud provider clusters data centers. Each region can include two or more availability zones connected to one another via a private high speed network, for example a fiber communication connection.

An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 260 via a publicly accessible network (e.g., the Internet, a cellular communication network). Regions are connected to a global network which includes private networking infrastructure (e.g., fiber connections controlled by the cloud provider) connecting each region to at least one other region. The provider network 260 may deliver content from points of presence outside of, but networked with, these regions by way of edge locations and regional edge cache servers. An edge location can be an extension of the cloud provider network outside of the traditional region/AZ context. For example an edge location can be a data center positioned to provide capacity to a set of customers within a certain latency requirement, a set of servers provided to a customer's premises, or a set of servers provided within (or forming part of) a cellular communications network, each of which can be controlled at least in part by the control plane of a nearby AZ or region. This compartmentalization and geographic distribution of computing hardware enables the provider network 260 to provide low-latency resource access to customers on a global scale with a high degree of fault tolerance and stability.

The traffic and operations of the provider network may broadly be subdivided into two categories in various embodiments: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the cloud provider network (e.g., computing instances, containers, block storage volumes, databases, file storage). Data plane traffic generally includes non-administrative operations such as transferring customer data to and from the customer resources. Certain control plane components (e.g., tier one control plane components such as the control plane for a virtualized computing service) are typically implemented on a separate set of servers from the data plane servers, while other control plane components (e.g., tier two control plane components such as analytics services) may share the virtualized servers with the data plane, and control plane traffic and data plane traffic may be sent over separate/distinct networks.

In some embodiments, provider network 260 may implement various computing resources or services, such as database service(s) 280, (e.g., relational database services, non-relational database services, a map reduce service, a data warehouse service, and/or other large scale data processing services or various other types database services), data storage service 270 (e.g., object storage services or block-based storage services that may implement a centralized data store for various types of data), and/or any other type of network based services (which may include a virtual compute service and various other types of storage, processing, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 8 and described below. In various embodiments, the functionality of a given system or service component (e.g., a component of database service 280 or data storage service 270) may be implemented by a particular node or may be distributed across several nodes. In some embodiments, a given node may implement the functionality of more than one service system component (e.g., more than one data store component).

Database services 280 may be various types of data processing services that perform general or specialized data processing functions (e.g., anomaly detection, machine learning, data mining, big data querying, or any other type of data processing operation). For example, in at least some embodiments, database services 280 may include a map reduce service that creates clusters of processing nodes that implement map reduce functionality over data stored in the map reduce cluster as well as data stored in data storage service 270. In another example, database service 280 may include various types of database services (both relational and non-relational) for storing, querying, and updating data. Such services may be enterprise-class database systems that are highly scalable and extensible. Queries may be directed to a database in data database service 280 that is distributed across multiple physical resources, and the database system may be scaled up or down on an as needed basis.

Database service 280 may work effectively with database schemas of various types and/or organizations, in different embodiments. In some embodiments, clients/subscribers may submit queries in a number of ways, e.g., interactively via an SQL interface to the database system. In other embodiments, external applications and programs may submit queries using Open Database Connectivity (ODBC) and/or Java Database Connectivity (JDBC) driver interfaces to the database system. For instance, database service 280 may implement, in some embodiments, a data warehouse service, that utilizes another data processing service, to execute portions of queries or other access requests with respect to data that is stored in a remote data store, such as data storage service(s) 270 (or a data store external to provider network 260) to implement distributed data processing for distributed data sets.

In at least some embodiments, database service 280 may be a data warehouse service. Thus in the description that follows database service 280 may be discussed according to the various features or components that may be implemented as part of a data ware house service, including control plane 250, proxy service (not shown), and query processing groups 200. Note that such features or components may also be implemented in a similar fashion for other types of database services and thus the following examples may be applicable to other types of database service 280. Database service 280 may implement one (or more) processing clusters that are attached to a database (e.g., a data warehouse). In some embodiments, these processing clusters may be designated as a primary and secondary (or concurrent, additional, or burst processing clusters) that perform queries to an attached database warehouse.

In embodiments where database service 280 is a data warehouse service, the data warehouse service may offer clients a variety of different data management services, according to their various needs. In some cases, clients may wish to store and maintain large of amounts data, such as sales records marketing, management reporting, business process management, budget forecasting, financial reporting, website analytics, or many other types or kinds of data. A client's use for the data may also affect the configuration of the data management system used to store the data. For instance, for certain types of data analysis and other operations, such as those that aggregate large sets of data from small numbers of columns within each row, a columnar database table may provide more efficient performance. In other words, column information from database tables may be stored into data blocks on disk, rather than storing entire rows of columns in each data block (as in traditional database schemes). The following discussion describes various embodiments of a relational columnar database system implemented as a data warehouse. However, various versions of the components discussed below as may be equally adapted to implement embodiments for various other types of relational database systems, such as row-oriented database systems. Therefore, the following examples are not intended to be limiting as to various other types or formats of database systems.

In some embodiments, storing table data in such a columnar fashion may reduce the overall disk I/O requirements for various queries and may improve analytic query performance. For example, storing database table information in a columnar fashion may reduce the number of disk I/O requests performed when retrieving data into memory to perform database operations as part of processing a query (e.g., when retrieving all of the column field values for all of the rows in a table) and may reduce the amount of data that needs to be loaded from disk when processing a query. Conversely, for a given number of disk requests, more column field values for rows may be retrieved than is necessary when processing a query if each data block stored entire table rows. In some embodiments, the disk requirements may be further reduced using compression methods that are matched to the columnar storage data type. For example, since each block contains uniform data (i.e., column field values that are all of the same data type), disk storage and retrieval requirements may be further reduced by applying a compression method that is best suited to the particular column data type. In some embodiments, the savings in space for storing data blocks containing only field values of a single column on disk may translate into savings in space when retrieving and then storing that data in system memory (e.g., when analyzing or otherwise processing the retrieved data).

Database service 280 may be implemented by a large collection of computing devices, such as customized or off-the-shelf computing systems, servers, or any other combination of computing systems or devices, such as the various types of systems 1000 described below with regard to FIG. 8. Different subsets of these computing devices may be controlled by control plane 250. Control plane 250, for example, may provide a control interface to clients or users who wish to interact with the processing groups, such as query processing groups 200 managed by control plane 250. For example, control plane 250 may generate one or more graphical user interfaces (GUIs) for clients, which may then be utilized to select various control functions offered by the control interface for the query processing groups 200 hosted in the database service 280. Control plane 250 may provide or implement access to various metrics collected for the performance of different features of database service 280, including processing cluster performance, in some embodiments.

As discussed above, various clients (or customers, organizations, entities, or users) may wish to store and manage data using a database service 280. Query processing groups 200 may respond to various requests, including write/update/store requests (e.g., to write data into storage) or queries for data (e.g., such as a Server Query Language request (SQL) for particular data). For example, multiple users or clients may access a processing cluster to obtain data warehouse services.

For databases manually managed by users, database service 280 may provide network endpoints directly to the clusters which allow the users manage in order to implement client applications that send requests and other messages directly to a particular cluster. Network endpoints, for example may be a particular network address, such as a URL, which points to a particular cluster. For instance, a client may be given the network endpoint "http://mycluster.com" to send various request messages to. Multiple clients (or users of a particular client) may be given a network endpoint for a particular cluster. Various security features may be implemented to prevent unauthorized users from accessing the clusters.

In at least some embodiments, database service 280 may implement proxy service to provide access to databases (e.g., data warehouses) hosted in database service 280. For databases managed by database service 280, database service 280 may provide database endpoints (e.g., network endpoints) for a hosted database. Database endpoints may not provide direct access to a particular query processing group 200, as the processing group used to respond to such requests (e.g., queries) may change according to various scaling techniques. Instead, client applications may utilize the database endpoint for a database to be included in various client applications or other communications for database access so that proxy service can direct the requests to the appropriate processing cluster without the client application having to be altered every time a change in processing cluster (e.g., scaling operations) are performed by database service 280. In this way, database service 280 can perform scaling and other management operations without interfering with client applications.

Query processing groups 200 hosted by database service 280 may provide an enterprise-class database query and management system that allows users to send data processing requests to be executed by the groups 200, such as by sending a query. Query processing groups 200 may perform data processing operations with respect to data stored locally in a processing cluster, as well as remotely stored data. For example, data storage service 270 implemented by provider network 260 that stores remote data, such as backups or other data of a database stored in a cluster. In some embodiments, database data 240 may not be stored locally in a query processing group 200 but instead may be stored in data storage service 270 (e.g., with data being partially or temporarily stored in query processing group 200 to perform queries). Queries sent to a processing cluster 23 (or routed/redirect/assigned/allocated to query processing group(s)) may be directed to local data stored in the processing cluster and/or remote data. Therefore, processing clusters may implement local data processing, such as local data processing, to plan and execute the performance of queries with respect to local data in the processing cluster, as well as a remote data processing client.

Database service 280 may implement different types or configurations of processing clusters. For example, different configurations may utilize various different configurations of computing resources, including, but not limited to, different numbers of computational nodes, different processing capabilities (e.g., processor size, power, custom or task-specific hardware, such as hardware accelerators to perform different operations, such as regular expression searching or other data processing operations), different amounts of memory, different networking capabilities, and so on. Thus, for some queries, different configurations of query processing groups 200 may offer different execution times. Different configurations of query processing groups 200 may be maintained in different pools of available processing clusters to be attached to a database. Attached processing clusters may then be made exclusively assigned or allocated for the use of performing queries to the attached database, in some embodiments. The number of query processing groups 200 attached to a database may change over time according to the selection techniques discussed below.

In some embodiments, database service 280 may have at least one query processing group attached to a database, which may be the "primary group." Primary groups may be reserved, allocated, permanent, or otherwise dedicated processing resources that store and/or provide access to a database for a client, in some embodiments. Primary groups, however, may be changed. For example, a different processing cluster may be attached to a database and then designated as the primary database (e.g., allowing an old primary group to still be used as a "secondary" processing cluster or released to a pool of processing clusters made available to be a attached to a different database). Techniques to resize or change to a different configuration of a primary group may be performed, in some embodiments. The available processing clusters that may also be attached, as determined, to a database may be maintained (as noted earlier) in different configuration type pools, which may be a set of warmed, pre-configured, initialized, or otherwise prepared clusters which may be on standby to provide additional query performance capacity in addition to that provided by a primary group. Control plane 250 may manage cluster pools by managing the size of cluster pools (e.g., by adding or removing processing clusters based on demand to use the different processing clusters).

As databases are created, updated, and/or otherwise modified, snapshots, copies, or other replicas of the database at different states may be stored separate from database service 280 in data storage service 250, in some embodiments. For example, a leader node, or other processing cluster component, may implement a backup agent or system that creates and store database backups for a database to be stored as database data 240 in data storage service 270. Database data 240 may include user data (e.g., tables, rows, column values, etc.) and database metadata (e.g., information describing the tables which may be used to perform queries to a database, such as schema information, data distribution, range values or other content descriptors for filtering out portions of a table from a query, a superblock, etc.). A timestamp or other sequence value indicating the version of database data 240 may be maintained in some embodiments, so that the latest database data 240 may, for instance, be obtained by a processing cluster in order to perform queries. In at least some embodiments, database data 240 may be treated as the authoritative version of data, and data stored in query processing groups 200 for local processing as a cached version of data.

Data storage service 270 may implement different types of data stores for storing, accessing, and managing data on behalf of clients 250 as a network-based service that enables clients 250 to operate a data storage system in a cloud or network computing environment. Data storage service(s) 270 may also include various kinds of object or file data stores for putting, updating, and getting data objects or files. For example, one data storage service 270 may be an object-based data store that allows for different data objects of different formats or types of data, such as structured data (e.g., database data stored in different database schemas), unstructured data (e.g., different types of documents or media content), or semi-structured data (e.g., different log files, human-readable data in different formats like JavaScript Object Notation (JSON) or Extensible Markup Language (XML)) to be stored and managed according to a key value or other unique identifier that identifies the object. In at least some embodiments, data storage service(s) 270 may be treated as a data lake. For example, an organization may generate many different kinds of data, stored in one or multiple collections of data objects in a data storage service 270. The data objects in the collection may include related or homogenous data objects, such as database partitions of sales data, as well as unrelated or heterogeneous data objects, such as audio files and web site log files. Data storage service(s) 270 may be accessed via programmatic interfaces (e.g., APIs) or graphical user interfaces. For example, a format independent data processing service may access data objects stored in data storage services via the programmatic interfaces.

Generally speaking, clients 250 may encompass any type of client that can submit network-based requests to provider network 260 via a network, including requests for storage services (e.g., a request to query a database service 280, or a request to create, read, write, obtain, or modify data in data storage service(s) 270, etc.). For example, a given client 250 may include a suitable version of a web browser, or may include a plug-in module or other type of code module that can execute as an extension to or within an execution environment provided by a web browser. Alternatively, a client 250 may encompass an application such as a database application (or user interface thereof), a media application, an office application or any other application that may make use of database service(s) 280 or storage resources in data storage service(s) 270 to store and/or access the data to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application that can interact directly with provider network 260. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 260 to other applications in a manner that is transparent to those applications. For example, client 250 may integrate with an operating system or file system to provide storage on one of data storage service(s) 270 (e.g., a block-based storage service). However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service(s) 270 may be coordinated by client 250 and the operating system or file system on behalf of applications executing within the operating system environment. Similarly, a client 250 may be an analytics application that relies upon data processing service(s) to execute various queries for data already ingested or stored in the data processing service (e.g., such as data maintained in a data warehouse service).

Clients 250 may convey network-based services requests (e.g., access requests to read or write data may be directed to data in data storage service(s) 270, or operations, tasks, or jobs, such as queries, being performed as part of data processing service(s)) to and receive responses from provider network 260 via network 260. In various embodiments, network 260 may encompass any suitable combination of networking hardware and protocols necessary to establish network-based-based communications between clients 250 and provider network 260. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 260 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 260. It is noted that in some embodiments, clients 250 may communicate with provider network 260 using a private network rather than the public Internet. In some embodiments, clients of data processing services and/or data storage service(s) 270 may be implemented within provider network 260 (e.g., an application hosted on a virtual computing resource that utilizes a data processing service to perform database queries) to implement various application features or functions and thus various features of client(s) 250 discussed above may be applicable to such internal clients as well.

As illustrated in the example of FIG. 2, a query processing group 200 may include a leader node 210 and compute node(s) 220, which may communicate with each other over an interconnect (not illustrated). Leader node 210 may implement query planning 212 to generate query plan(s), query execution 214 for executing queries on query processing group 200 that perform data processing that can utilize remote query processing resources for remotely stored data (e.g., by utilizing one or more query execution slot(s)/queue(s) 217). As described herein, each node in a processing cluster 200 may include attached storage, such as attached storage 222 on which a database (or portions thereof) may be stored on behalf of clients (e.g., users, client applications, and/or storage service subscribers).

Note that in at least some embodiments, query processing capability may be separated from compute nodes, and thus in some embodiments, additional components may be implemented for processing queries. Additionally, it may be that in some embodiments, no one node in processing cluster 200 is a leader node as illustrated in FIG. 2, but rather different nodes of the nodes in processing cluster 200 may act as a leader node or otherwise direct processing of queries to data stored in processing cluster 200. While nodes of processing cluster may be implemented on separate systems or devices, in at least some embodiments, some or all of processing cluster may be implemented as separate virtual nodes or instance on the same underlying hardware system (e.g., on a same server).

Leader node 210 may manage communications with clients 290. Leader node 710 may communicate with proxy service (not shown) and may receive query 201 and return query results 203 to proxy service (instead of communicating directly with a client application).

Leader node 210 may be a node that receives a query 201 from various client programs (e.g., applications) and/or subscribers (users) (either directly or routed to leader node 210 from proxy service), then parses them and develops an execution plan (e.g., query plan(s)) to carry out the associated database operation(s)). More specifically, leader node 210 may develop the series of steps necessary to obtain results for the query. Query 201 may be directed to data that is stored both locally within processing cluster 200 (e.g., at one or more of compute nodes 220) and data stored remotely. Leader node 210 may also manage the communications among compute nodes 220 instructed to carry out database operations for data stored in the processing cluster 200. For example, node-specific query instructions 204 may be generated or compiled code by query execution 214 that is distributed by leader node 210 to various ones of the compute nodes 220 to carry out the steps needed to perform query 201, including executing the code to generate intermediate results of query 201 at individual compute nodes may be sent back to the leader node 210. Leader node 210 may receive data and query responses or results from compute nodes 220 in order to determine a final result 203 for query 201.

A database schema, data format and/or other metadata information for the data stored among the compute nodes, such as the data tables stored in the cluster, may be managed and stored by leader node 210. Query planning 212 may account for remotely stored data by generating node-specific query instructions that include remote operations to be directed by individual compute node(s). Although not illustrated, in some embodiments, a leader node may implement burst manager to send 206 a query plan generated by query planning 212 to be performed at another attached processing cluster and return results 208 received from the burst processing cluster to a client as part of results 203.

In at least some embodiments, a result cache 219 may be implemented as part of leader node 210. For example, as query results are generated, the results may also be stored in result cache 219 (or pointers to storage locations that store the results either in primary processing cluster 200 or in external storage locations), in some embodiments. Result cache 219 may be used instead of other processing cluster capacity, in some embodiments, by recognizing queries which would otherwise be sent to another attached processing cluster to be performed that have results stored in result cache 219. Various caching strategies (e.g., LRU, FIFO, etc.) for result cache 219 may be implemented, in some embodiments. Although not illustrated in FIG. 2, result cache 219 could be stored in other storage systems (e.g., other storage services, such as a NoSQL database) and/or could store sub-query results.

Processing cluster 200 may also include compute nodes 220. Compute nodes 220, may for example, be implemented on servers or other computing devices, such as those described below with regard to computer system 1000 in FIG. 8, and each may include individual query processing "slices" defined, for example, for each core of a server's multi-core processor, one or more query processing engine(s), such as query engine(s) 224, to execute the instructions 204 or otherwise perform the portions of the query plan assigned to the compute node. Query engine(s) 224 may access a certain memory and disk space in order to process a portion of the workload for a query (or other database operation) that is sent to one or more of the compute nodes 220. Query engine 224 may access attached storage, such as 222, to perform local operation(s), such as local operations 218. For example, query engine 224 may scan data in attached storage 222, access indexes, perform joins, semi joins, aggregations, or any other processing operation assigned to the compute node 220.

Query engine 224 may also direct the execution of remote data processing operations, by providing remote operation(s), such as remote operations 216, to remote data processing clients, such as remote data processing client 226. Remote data processing clients 226 may be implemented by a client library, plugin, driver or other component that sends request sub-queries to be performed by data storage service 270 or requests to for data, 232. As noted above, in some embodiments, Remote data processing clients 226 may read, process, or otherwise obtain data 234 in response from database data 240 in data storage service 270, which may further process, combine, and or include them with results of location operations 218.

Compute nodes 220 may send intermediate results from queries back to leader node 210 for final result generation (e.g., combining, aggregating, modifying, joining, etc.). Remote data processing clients 226 may retry data requests 232 that do not return within a retry threshold.

Attached storage 222 may be implemented as one or more of any type of storage devices and/or storage system suitable for storing data accessible to the compute nodes, including, but not limited to: redundant array of inexpensive disks (RAID) devices, disk drives (e.g., hard disk drives or solid state drives) or arrays of disk drives such as Just a Bunch Of Disks (JBOD), (used to refer to disks that are not implemented according to RAID), optical storage devices, tape drives, RAM disks, Storage Area Network (SAN), Network Access Storage (NAS), or combinations thereof. In various embodiments, disks may be formatted to store database tables (e.g., in column oriented data formats or other data formats).

Figure 3A:
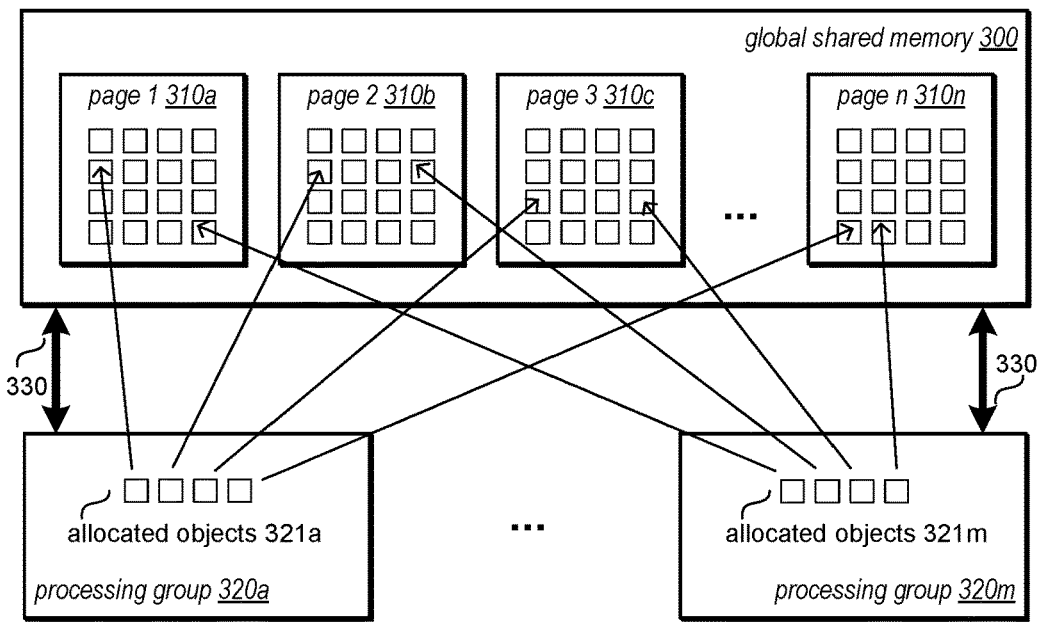
FIG. 3A is a logical block diagram of a conventional shared memory processing system, according to some embodiments.

FIG. 3A is a logical block diagram of a conventional shared memory processing system, according to some embodiments. Processing groups 320, including groups 320a-320m, may collectively share a global shared memory 300. Data objects may be allocated from individual shared memory pages 310, including pages 310a, 310b and 310c-310n to produce allocated objects 321, including allocated pbjects 321a-321m, in various embodiments. Memory allocation and deallocation requests 330 may be performed between the various processing groups 320 and the global shared memory 300.

In a conventional shared memory processing system, individual objects may be allocated and deallocated in the global shared memory pool based directly and may distribute the objects to different physical pages. This prevents the identifying of affected memory pages upon abnormal execution of a process of a processing group. Furthermore, this precludes the use of processor protection flags to protect the objects from unintended changes. Thus, abnormal execution of a process may lead to corruption of global memory state in a conventional shared memory processing system.

Figure 3B:
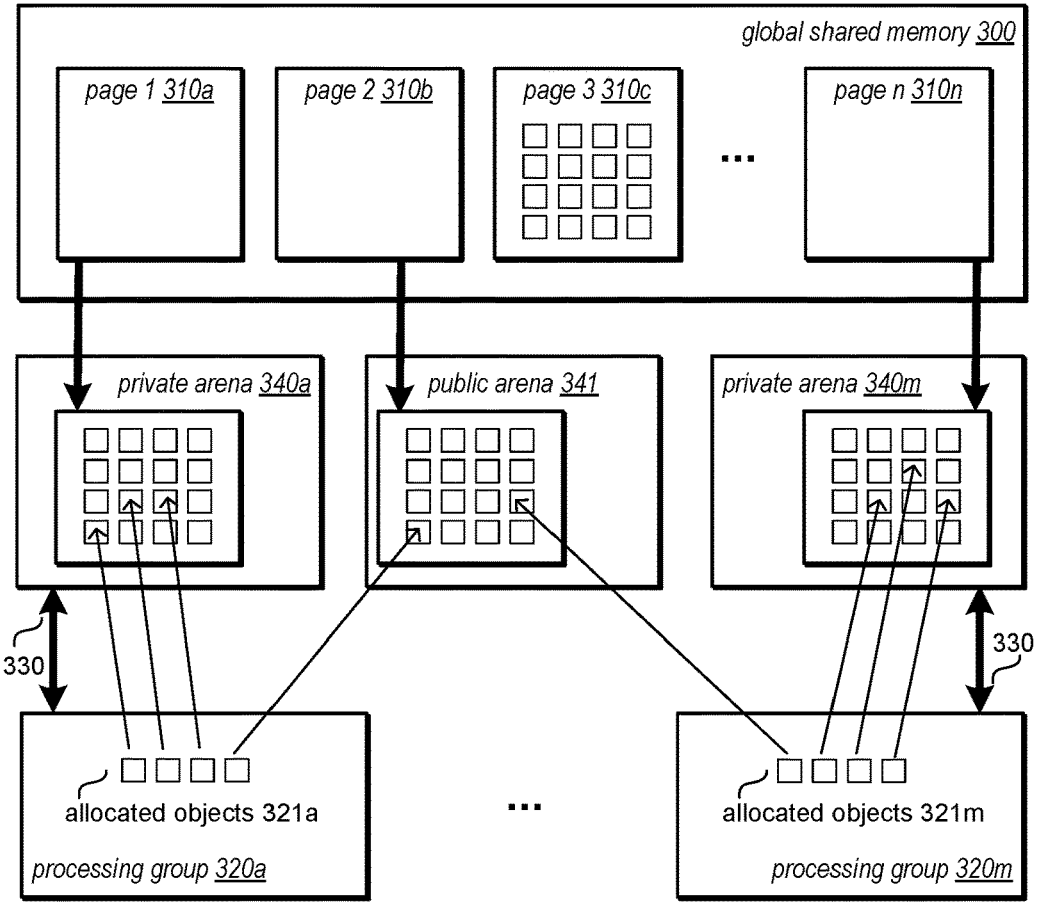
FIG. 3B is a logical block diagram of a shared memory processing system with improved crash resilience, according to some embodiments.

FIG. 3B is a logical block diagram of a shared memory processing system with improved crash resilience, according to some embodiments. Processing groups 320, such as the processing groups 120 of FIG. 1, may collectively share a global shared memory 300, such as provided by the shared memory manager 130 of FIG. 1, in various embodiments. Rather than allocate objects from pages of the global shared memory directly, memory allocation and deallocation requests 330 may instead be performed between the various processing groups 320 and the memory arenas 340 and 341, including private arenas 340a-340m and public arena 341. Examples of such arenas are the public arena 134 and private arena(s) 136 as shown above in FIG. 1. Pages 310 of the global shared memory 300 may be allocated as needed to the various memory arenas.

Individual ones of the processing groups 320 may have an associated group-private arena 340 for which the processing group has read-write access. Modifications to data objects allocated within a group-private arena 340 may only affect processing state of the individual processing group. Therefore, abnormal execution of a process of a processing group may only affect that processing group provided that modified objects are constrained only to the group-private arena 340, in some embodiments. In these cases, recovery of abnormal execution of a process of a processing group may be performed without affecting other processing groups, in some embodiments. A processing group is excluded from access to group-private arenas 340 that are associated with other processing groups different from the processing group.

In order to support allocating memory for truly shared objects such as disk blocks. IPC messages, communications packets, logging and the like, a public arena 341 may also be provided. Unlike the group-private arenas 340, the public arena 341 may be accessible by all processing groups 320. However, individual processing groups 320 may, by default, have read-only access to data objects allocated in the public arena 341. Thus, abnormal execution of a process of a processing group may still avoid corruption of shared memory state, in some embodiments. In order to affect changes to data objects in the public arena, a process of a processing group 320 may elevate execution privilege in order to obtain read-write access to object(s) in the public arena 341, as discussed further below in FIG. 7. During this time of elevated privilege, abnormal execution of the process may lead to corruption of global memory state, in some embodiments.

By organizing allocation of data objects into various arenas, control over allocation of data objection into specific memory pages 310 may be accomplished, in various embodiments. This enables the use of per page memory protection featured of modern computing processors and memory management units, this leading to more efficient crash resiliency in shared memory data processing systems, in some embodiments.

Figure 4:
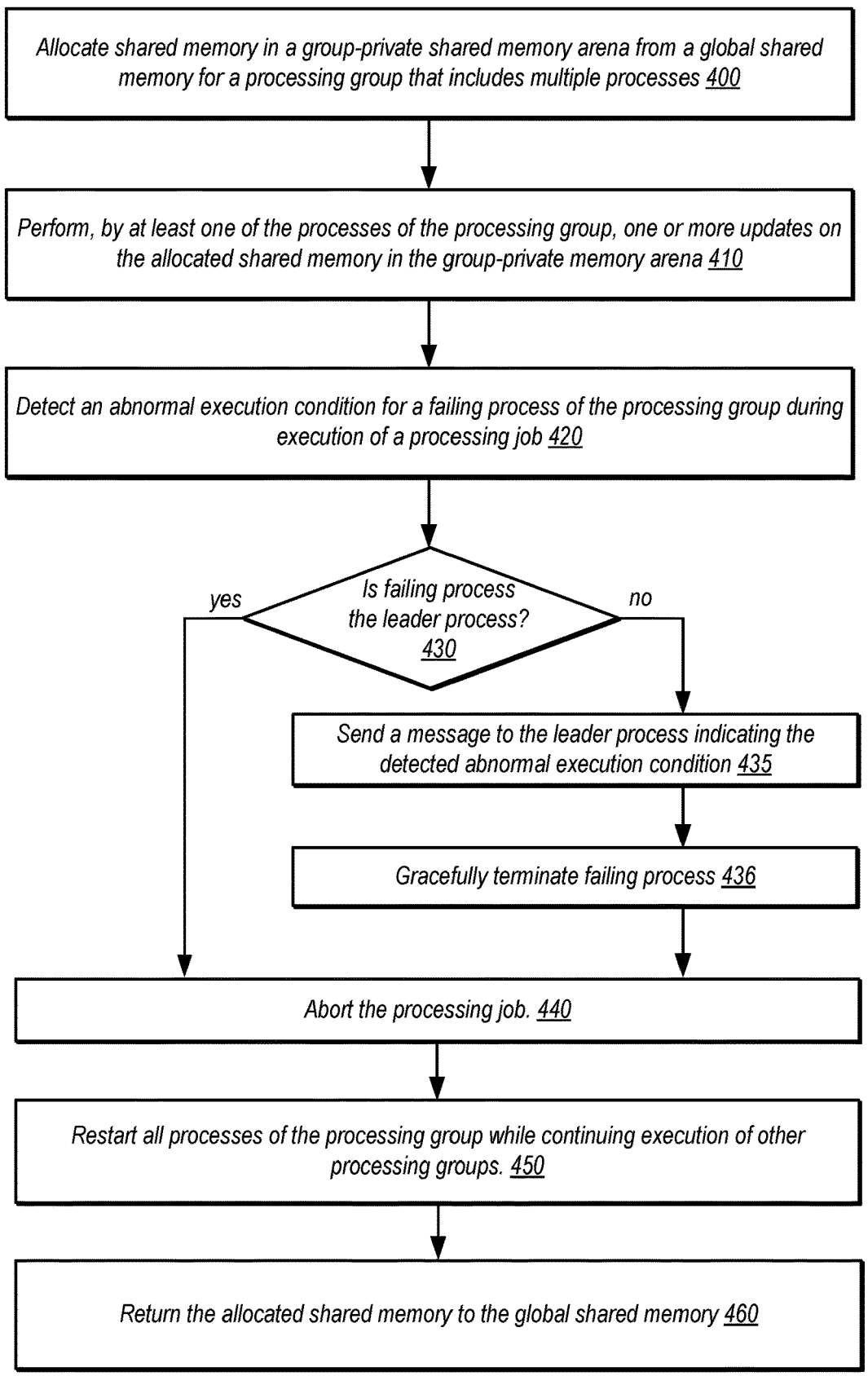
FIG. 4 is a flow diagram illustrating improved crash resilience, according to some embodiments.

FIG. 4 is a flow diagram illustrating improved crash resilience, according to some embodiments. In data processing application implementing improved crash resiliency, as shown in 400, a processing group such as the processing group 120 of FIG. 1, including multiple executing processes may allocate shared memory from a global shared memory pool, such as the memory pool 132 of FIG. 1, into a group-private shared memory arena, such as the private arena 136 of FIG. 1, in some embodiments. As discussed above in FIG. 3, processes of the processing group may have read-write access to various data objects allocated within this allocated memory in the group-private shared memory arena, in some embodiments.

As shown in 410, one or more of the processes of the processing group may employ the read-write access to the allocated memory to perform one or more updates to data objects allocated within the allocated memory in the group-private shared memory arena.

As shown in 420, an abnormal execution condition, such as a protected memory fault, an uncaught processing exception or an assertion from third party software, may then be detected at a failing process of the processing group, in some embodiments. This abnormal execution condition may be detected during execution of a processing job assigned to the processing group, in various embodiments.

Responsive to this detection, the failing process, as discussed further in FIGS. 7 and 8 below, may determine if it is a leader process, as shown in 430. If the failing process is a leader process, such as the leader process 122 of FIG. 1, as indicated in a positive exit at 430, the method may proceed to step 440. If the failing process is not a leader process but a compute process, such as the compute process 124 of FIG. 1, as indicated in a negative exit at 430, the method may proceed to step 435.

As shown in step 435, if the failing process is not a leader process, the failing process may then send a message to the leader process of the processing group indicating the detected abnormal execution condition, in some embodiments. Upon receiving this message, the leader process may then gracefully terminate the failing process, as shown in 436. The method may then proceed to step 440.

As shown in step 440, if the failing process is a leader process, the leader process may then abort the assigned processing job and restart all processes, as shown in 450, of the processing group while continuing execution of processes in other processing groups, in some embodiments. By restarting only the processing group without restarting other processes in other groups, disruption of the data processing application may be minimized, in some embodiments. The method may then proceed to step 460.

As shown in 460, the method may then return the allocated shared memory in the group-private memory arena to the global shared memory, in some embodiments.

Figure 5A:
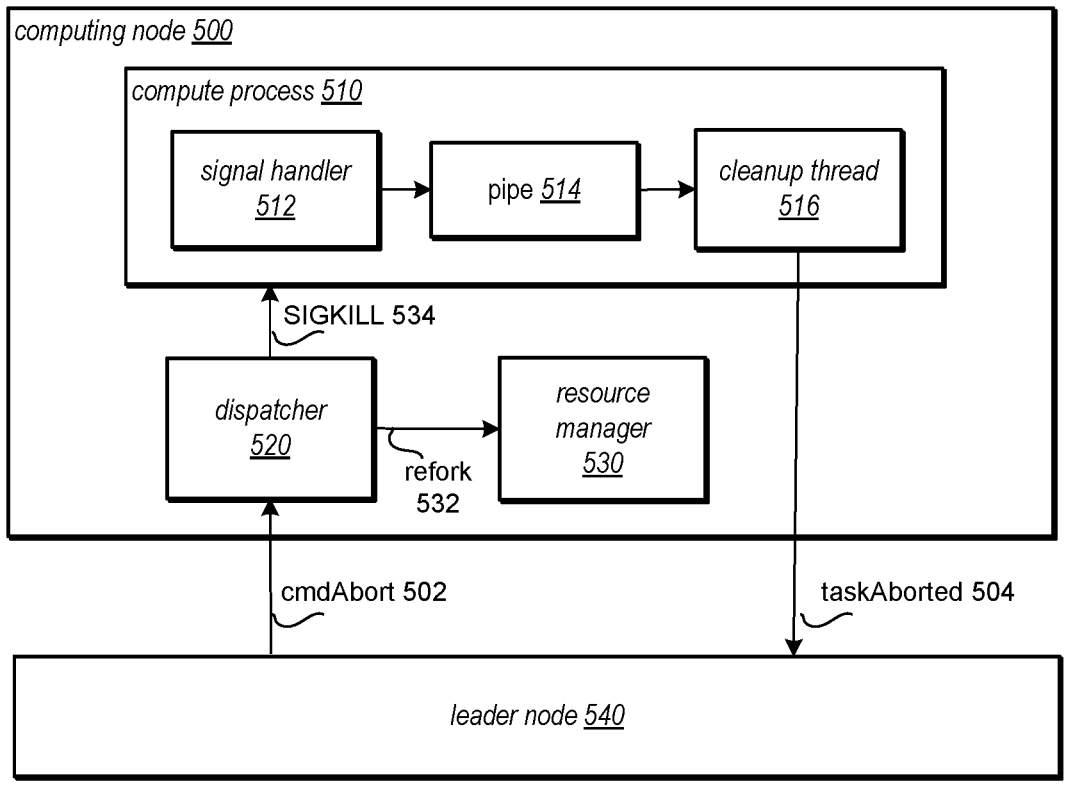
FIG. 5A is a logical block diagram illustrating fault signaling of a computing node in a shared memory processing system with improved crash resilience, according to some embodiments.
Figure 5B:
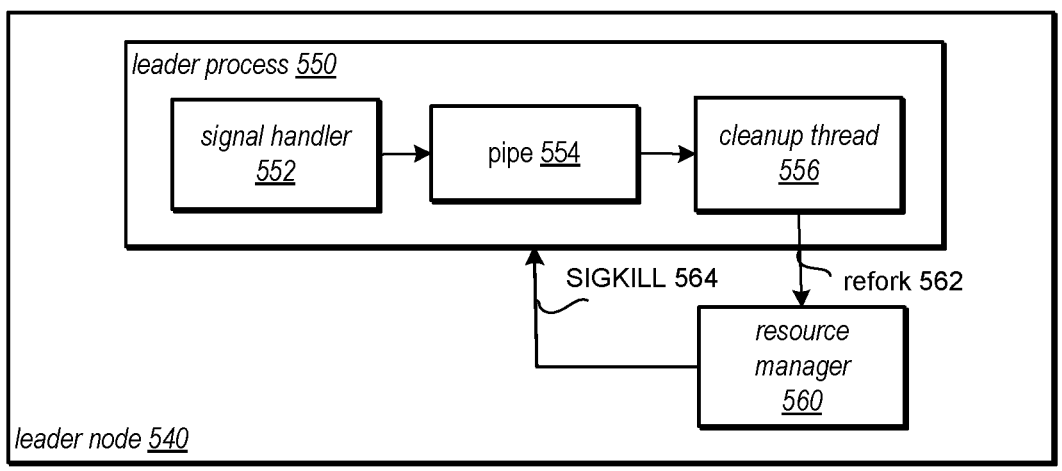
FIG. 5B is a logical block diagram illustrating fault signaling of a leader node in a shared memory processing system with improved crash resilience, according to some embodiments.

FIGS. 5A and 5B are logical block diagrams illustrating fault signaling in a shared memory processing system with improved crash resilience, according to some embodiments. One or more computing nodes, may implement a compute node 500 and a leader node 540, in some embodiments. In some embodiments, these nodes may be implemented on a same computing system, such as described below in FIG. 8, while in other embodiments, the nodes may be implemented using separate systems to form a distributed system.

As shown in FIG. 5A, a computing node 500 may implement at least one compute process 510, a process dispatcher 520 and a resource manager 530, in some embodiments. The compute process 510 may implement one or more execution threads (not shown) with each execution thread implementing a signal hander 512. These signal handlers may respectively communicate via a pipe 514 to a cleanup thread 516, in some embodiments.

If an abnormal execution condition, such as a protected memory fault, an uncaught processing exception or an assertion from third party software, is detected at a signal handler 512, the signal handler may write information describing the abnormal execution condition to the pipe 514. This may allow the signal handler 514 to communicate information regarding the uncaught processing exception while complying with the execution constraints of an exception or signal handler. Once the information is written, the signal handler may enter an infinite execution loop until the compute process 510 terminates, in some embodiments.

Upon receiving abnormal execution condition information from the pipe 514, the cleanup thread 516 may send a taskAborted message 504 to the leader node 540 of the process group. The leader node 540 may then send cmdAbort message(s) 502 to various ones of the computing nodes of the process group, in some embodiments.

Should the dispatcher 520 receive a cmdAbort message 502 from the leader process 540, the dispatcher may determine if a shared memory state may be safely recovered. In some embodiments, to make this determination, the dispatcher 520 may determine if the compute process 510 possesses elevated privileges to modify public shared memory, in some embodiments. This elevated privilege may be indicated in a number of ways. For example, compute process privilege may be indicated by explicit memory access privileges in some embodiments while in other embodiments compute process privilege may be indicated through control of synchronization primitives such as lock or mutex ownership. These examples are not intended to be limiting, however, and any number of compute process privilege indications may be envisioned.

Should elevated compute process privilege be determined, the dispatcher 520 may indicate a need to restart the entire application including all processes of all processing groups, in some embodiments. Should no compute process privilege be determined, the dispatcher 520 may send a refork request for the compute process 510 to the resource manager 530 after removing the compute process from the processing group. The dispatcher 520 may then send a SIGKILL signal to terminated to the compute process 510, in some embodiments.

As shown in FIG. 5B, the leader process may implement one or more execution threads (not shown) with each execution thread implementing a signal hander 552. These signal handlers may respectively communicate via a pipe 554 to a cleanup thread 556, in some embodiments.

If an abnormal execution condition, such as a protected memory fault, an uncaught processing exception or an assertion from third party software, is detected at a signal handler 552, the signal handler may write information describing the abnormal execution condition to the pipe 554. This may allow the signal handler 554 to communicate information regarding the uncaught processing exception while complying with the execution constraints of an exception or signal handler. Once the information is written, the signal handler may enter an infinite execution loop until the leader process 550 terminates, in some embodiments.

Upon receiving abnormal execution condition information from the pipe 554, the cleanup thread 556 may send cmdAbort messages 502 to various ones of the computing nodes of the process group, in some embodiments. As a result, individual ones of the computing nodes will proceed as discussed above with respect to FIG. 5A, in some embodiments. The cleanup thread 556 may then send a refork request to a resource manager 560 executing on the leader node after removing the compute process from the processing group. The resource manager 560 may then send a SIGKILL signal to terminated to the compute process 560, in some embodiments.

Figure 6:
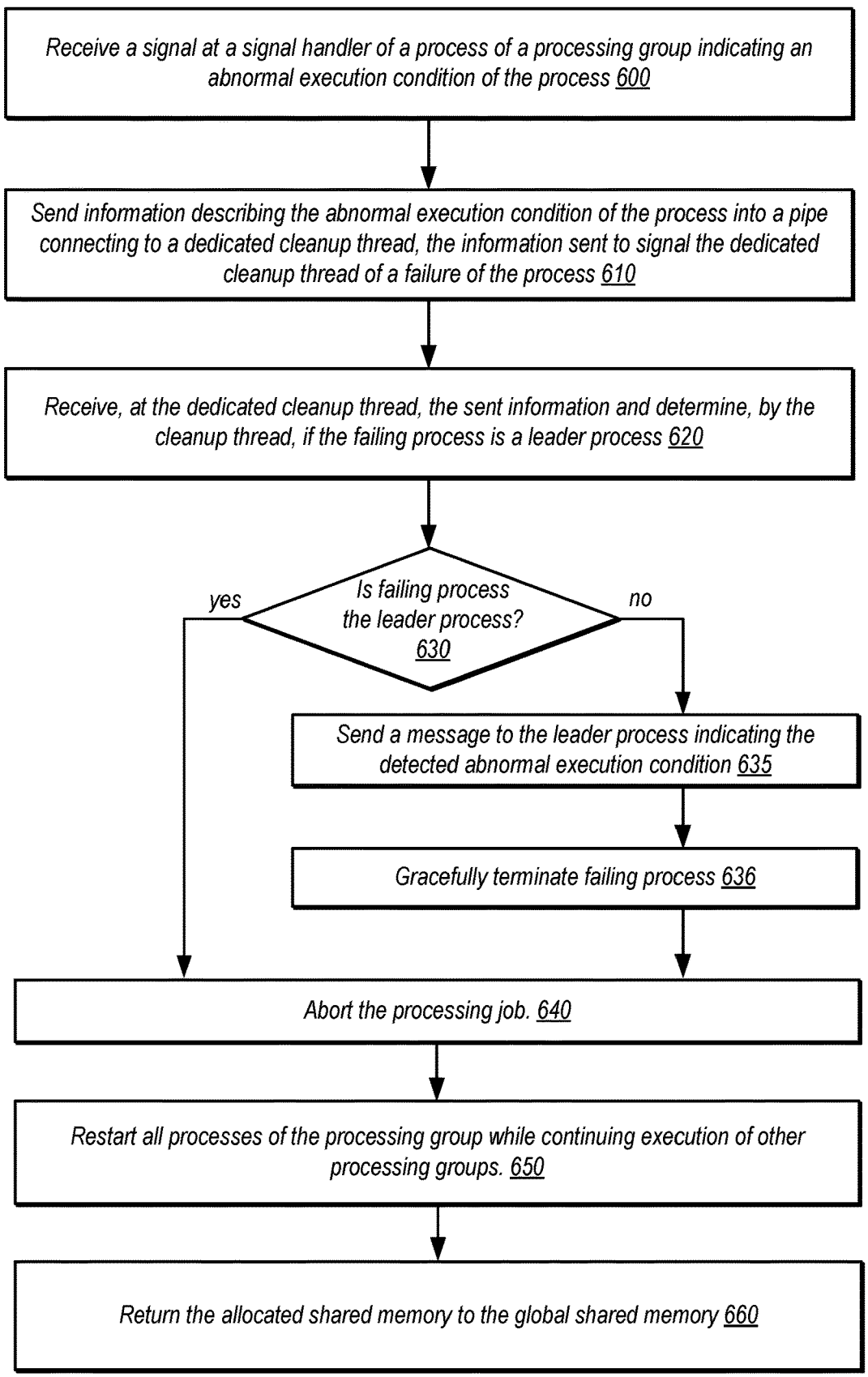
FIG. 6 is a flow diagram illustrating fault signaling in a shared memory processing system with improved crash resilience, according to some embodiments.

FIG. 6 is a flow diagram illustrating fault signaling in a shared memory processing system with improved crash resilience, according to some embodiments. In data processing application implementing improved crash resiliency, as shown in 600, a processing group such as the processing group 120 of FIG. 1, including multiple executing processes may allocate shared memory from a global shared memory pool, such as the memory pool 132 of FIG. 1, into a group-private shared memory arena, such as the private arena 136 of FIG. 1, in some embodiments. As discussed above in FIG. 3, processes of the processing group may have read-write access to various data objects allocated within this allocated memory in the group-private shared memory arena, in some embodiments.

As shown in 610, one or more of the processes of the processing group may employ the read-write access to the allocated memory to perform one or more updates to data objects allocated within the allocated memory in the group-private shared memory arena.

As shown in 620, an abnormal execution condition, such as a protected memory fault, an uncaught processing exception or an assertion from third party software, may then be detected at a failing process of the processing group, in some embodiments. This abnormal execution condition may be detected during execution of a processing job assigned to the processing group, in various embodiments.

Responsive to this detection, the failing process may determine if it is a leader process, as shown in 630. If the failing process is a leader process, such as the leader process 122 of FIG. 1, as indicated in a positive exit at 630, the method may proceed to step 640. If the failing process is not a leader process but a compute process, such as the compute process 124 of FIG. 1, as indicated in a negative exit at 630, the method may proceed to step 635.

As shown in step 635, if the failing process is not a leader process, the failing process may then send a message to the leader process of the processing group indicating the detected abnormal execution condition, in some embodiments. Upon receiving this message, the leader process may then gracefully terminate the failing process, as shown in 436. The method may then proceed to step 440.

As shown in step 640, if the failing process is a leader process, the leader process may then abort the assigned processing job and restart all processes, as shown in 650, of the processing group while continuing execution of processes in other processing groups, in some embodiments. By restarting only the processing group without restarting other processes in other groups, disruption of the data processing application may be minimized, in some embodiments. The method may then proceed to step 660.

As shown in 660, the method may then return the allocated shared memory in the group-private memory arena to the global shared memory, in some embodiments.

Figure 7:
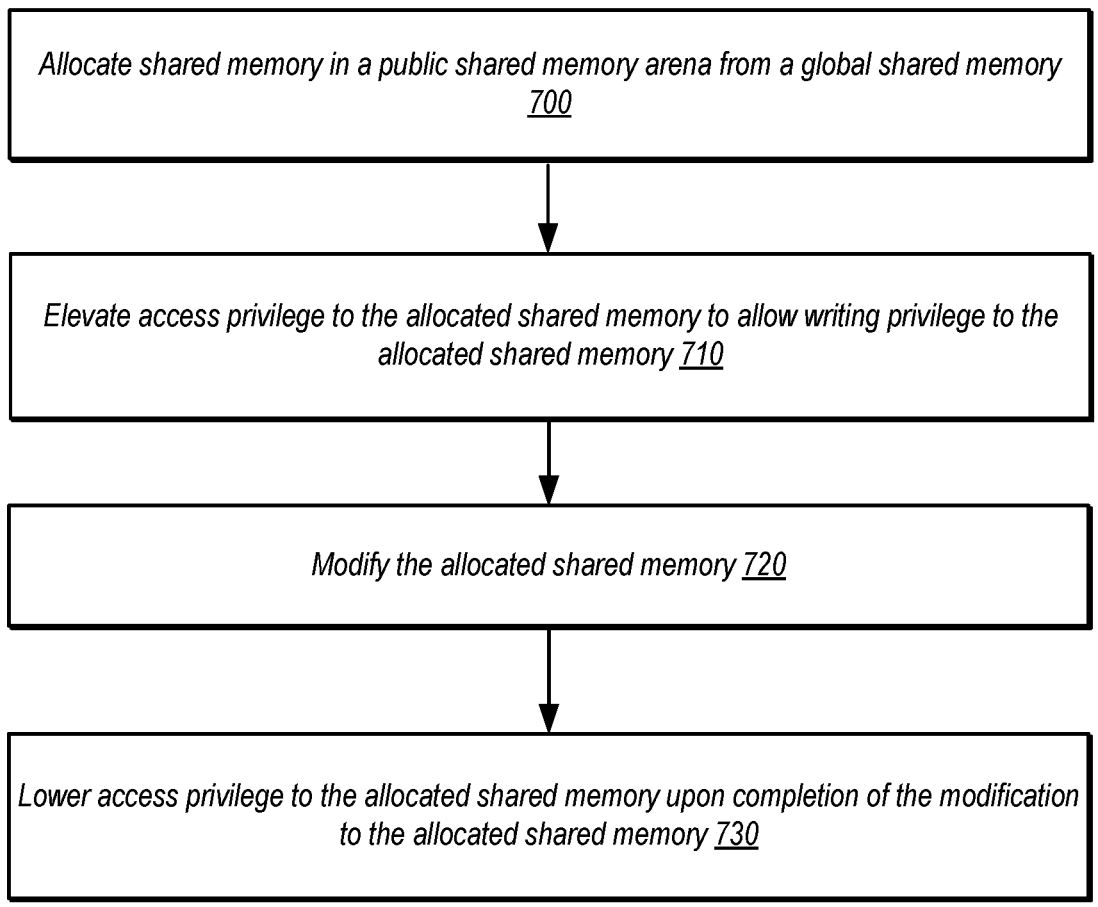
FIG. 7 is a flow diagram illustrating updating global memory state in a shared memory processing system with improved crash resilience, according to some embodiments.

FIG. 7 is a flow diagram illustrating updating global memory state in a shared memory processing system with improved crash resilience, according to some embodiments. The method begins at step 700 where memory for a shared object may be allocated in a public shared memory arena from a global shared memory, in some embodiments. Examples of such shared objects are objects that are shared across multiple queries including network packets (packets headers), database row sets, log files, access credentials, results caches, code pools and so forth. Such examples are not intended to be limiting and any number of shared objects may be envisioned.

Once a determination has been made to modify the public shared memory object, as shown in 710, access privilege to the public shared memory object may be elevated, in some embodiments, to allow writing privilege to the allocated shared memory. For example, privilege may be elevated through an explicit memory access privilege escalation in some embodiments while in other embodiments privilege may be elevated through allocation of synchronization primitives such as a lock or mutex. These examples are not intended to be limiting, however, and any number of privilege elevation mechanisms may be envisioned.

Once access privilege has been elevated, in some embodiments the allocated shared memory may be modified and committed, as shown in 720. During this process, it should be noted that any abnormal execution condition of a process with such elevated privilege may result in a corrupted state of global shared memory.

Upon completion of modification of the allocated memory, as shown in 730, access privilege to the allocated shared memory may then be lowered, in some embodiments. Upon lowering of access privilege, an abnormal execution condition of a process with such lowered privilege may occur without corruption of a state of global shared memory.

The methods described herein may in various embodiments be implemented by any combination of hardware and software. For example, in one embodiment, the methods may be implemented by a computer system (e.g., a computer system as in FIG. 8) that includes one or more processors executing program instructions stored on a computer-readable storage medium coupled to the processors. The program instructions may implement the functionality described herein (e.g., the functionality of various servers and other components that implement the network-based virtual computing resource provider described herein). The various methods as illustrated in the figures and described herein represent example embodiments of methods. The order of any method may be changed, and various elements may be added, reordered, combined, omitted, modified, etc.

Figure 8:
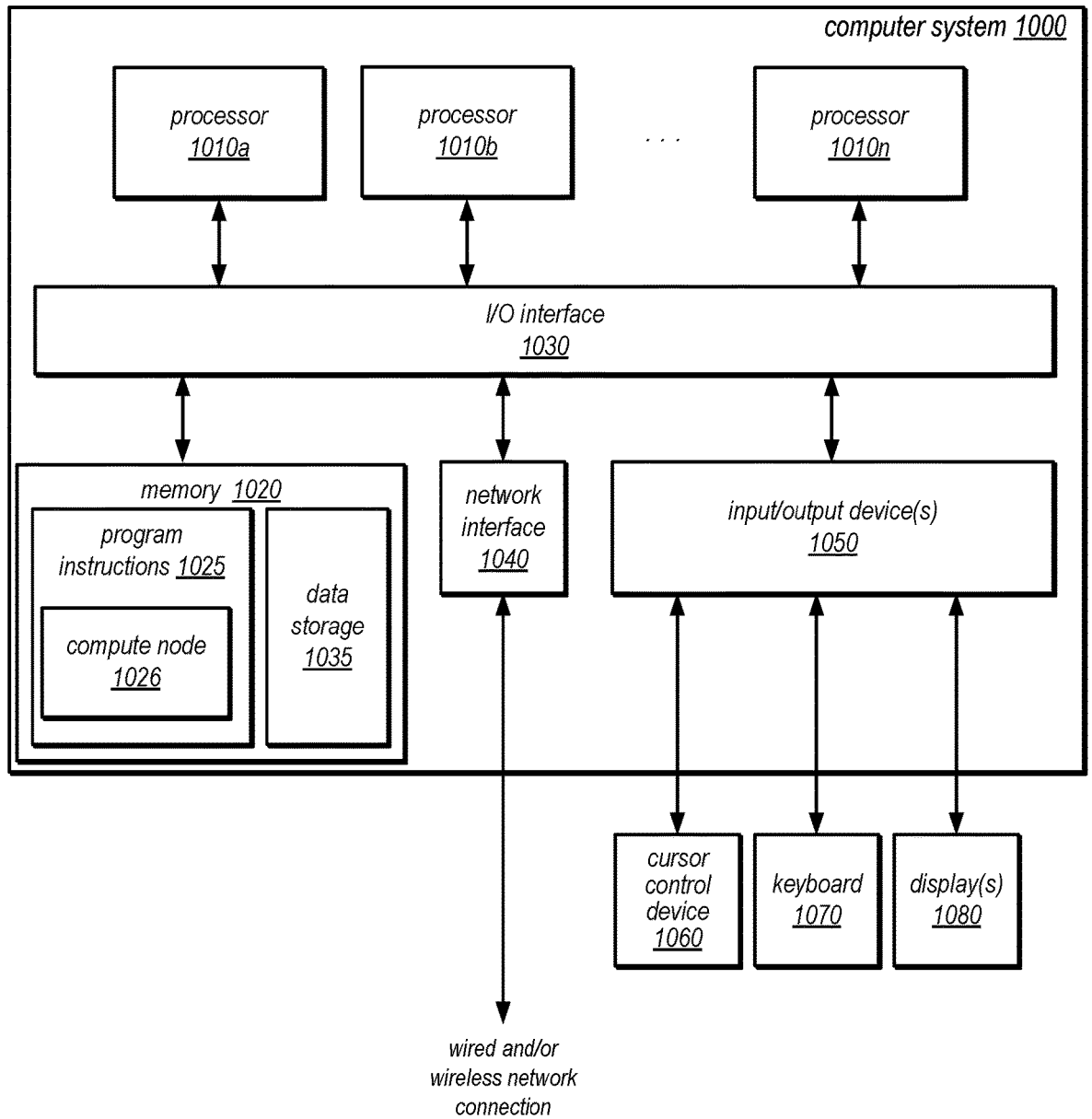
FIG. 8 illustrates an example system that implements the various methods, techniques, and systems described herein, according to some embodiments.

Various ones of the illustrated embodiments may include one or more computer systems 1000 such as that illustrated in FIG. 8 or one or more components of the computer system 1000 that function in a same or similar way as described for the computer system 1000.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030. In some embodiments, computer system 1000 may be illustrative of servers implementing enterprise logic or downloadable applications, while in other embodiments servers may include more, fewer, or different elements than computer system 1000.

Computer system 1000 includes one or more processors 1010 (any of which may include multiple cores, which may be single or multi-threaded) coupled to a system memory 1020 via an input/output (I/O) interface 1030. Computer system 1000 further includes a network interface 1040 coupled to I/O interface 1030. In various embodiments, computer system 1000 may be a uniprocessor system including one processor 1010, or a multiprocessor system including several processors 1010 (e.g., two, four, eight, or another suitable number). Processors 1010 may be any suitable processors capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA. The computer system 1000 also includes one or more network communication devices (e.g., network interface 1040) for communicating with other systems and/or components over a communications network (e.g. Internet, LAN, etc.). For example, a client application executing on system 1000 may use network interface 1040 to communicate with a server application executing on a single server or on a cluster of servers that implement one or more of the components of the embodiments described herein. In another example, an instance of a server application executing on computer system 1000 may use network interface 1040 to communicate with other instances of the server application (or another server application) that may be implemented on other computer systems.

System memory 1010 may store instructions and data accessible by processor 1010. In various embodiments, system memory 1020 may be implemented using any suitable memory technology, such as static random-access memory (SRAM), synchronous dynamic RAM (SDRAM), non-volatile/Flash-type memory, or any other type of memory. In the illustrated embodiment, program instructions and data implementing desired functions, such as those methods and techniques as described above for providing a database compute node, as indicated at 1026, are shown stored within system memory 1020 as program instructions 1025. In some embodiments, system memory 1020 may include data store 1045 which may be configured as described herein.

In some embodiments, system memory 1020 may be one embodiment of a computer-accessible medium that stores program instructions and data as described above. However, in other embodiments, program instructions and/or data may be received, sent or stored upon different types of computer-accessible media. Generally speaking, a computer-accessible medium may include computer-readable storage media or memory media such as magnetic or optical media, e.g., disk or DVD/CD-ROM coupled to computer system 1000 via I/O interface 1030. A computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. Further, a computer-accessible medium may include transmission media or signals such as electrical, electromagnetic, or digital signals, conveyed via a communication medium such as a network and/or a wireless link, such as may be implemented via network interface 1040.

In one embodiment, I/O interface 1030 may coordinate I/O traffic between processor 1010, system memory 1020 and any peripheral devices in the system, including through network interface 1040 or other peripheral interfaces. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. Also, in some embodiments, some or all of the functionality of I/O interface 1030, such as an interface to system memory 1020, may be incorporated directly into processor 1010.

Network interface 1040 may allow data to be exchanged between computer system 1000 and other devices attached to a network, such as between a client device and other computer systems, or among hosts, for example. In particular, network interface 1040 may allow communication between computer system 800 and/or various other device 1060 (e.g., I/O devices). Other devices 1060 may include scanning devices, display devices, input devices and/or other communication devices, as described herein. Network interface 1040 may commonly support one or more wireless networking protocols (e.g., Wi-Fi/IEEE 802.7, or another wireless networking standard). However, in various embodiments, network interface 1040 may support communication via any suitable wired or wireless general data networks, such as other types of Ethernet networks, for example. Additionally, network interface 1040 may support communication via telecommunications/telephony networks such as analog voice networks or digital fiber communications networks, via storage area networks such as Fibre Channel SANs, or via any other suitable type of network and/or protocol.

In some embodiments, I/O devices may be relatively simple or "thin" client devices. For example, I/O devices may be implemented as dumb terminals with display, data entry and communications capabilities, but otherwise little computational functionality. However, in some embodiments, I/O devices may be computer systems implemented similarly to computer system 1000, including one or more processors 1010 and various other devices (though in some embodiments, a computer system 1000 implementing an I/O device 1050 may have somewhat different devices, or different classes of devices).

In various embodiments, I/O devices (e.g., scanners or display devices and other communication devices) may include, but are not limited to, one or more of: handheld devices, devices worn by or attached to a person, and devices integrated into or mounted on any mobile or fixed equipment, according to various embodiments. I/O devices may further include, but are not limited to, one or more of: personal computer systems, desktop computers, rack-mounted computers, laptop or notebook computers, workstations, network computers, "dumb" terminals (i.e., computer terminals with little or no integrated processing ability), Personal Digital Assistants (PDAs), mobile phones, or other handheld devices, proprietary devices, printers, or any other devices suitable to communicate with the computer system 1000. In general, an I/O device (e.g., cursor control device, keyboard, or display(s) may be any device that can communicate with elements of computing system 1000.

The various methods as illustrated in the figures and described herein represent illustrative embodiments of methods. The methods may be implemented manually, in software, in hardware, or in a combination thereof. The order of any method may be changed, and various elements may be added, reordered, combined, omitted, modified, etc. For example, in one embodiment, the methods may be implemented by a computer system that includes a processor executing program instructions stored on a computer-readable storage medium coupled to the processor. The program instructions may be configured to implement the functionality described herein.

Various modifications and changes may be made as would be obvious to a person skilled in the art having the benefit of this disclosure. It is intended to embrace all such modifications and changes and, accordingly, the above description to be regarded in an illustrative rather than a restrictive sense.

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, volatile or non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

Embodiments of decentralized application development and deployment as described herein may be executed on one or more computer systems, which may interact with various other devices. FIG. 6 is a block diagram illustrating an example computer system, according to various embodiments. For example, computer system 1000 may be configured to implement nodes of a compute cluster, a distributed key value data store, and/or a client, in different embodiments. Computer system 1000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of compute node, computing node, or computing device.

In the illustrated embodiment, computer system 1000 also includes one or more persistent storage devices 1060 and/or one or more I/O devices 1080. In various embodiments, persistent storage devices 1060 may correspond to disk drives, tape drives, solid state memory, other mass storage devices, or any other persistent storage device. Computer system 1000 (or a distributed application or operating system operating thereon) may store instructions and/or data in persistent storage devices 1060, as desired, and may retrieve the stored instruction and/or data as needed. For example, in some embodiments, computer system 1000 may be a storage host, and persistent storage 1060 may include the SSDs attached to that server node.

In some embodiments, program instructions 1025 may include instructions executable to implement an operating system (not shown), which may be any of various operating systems, such as UNIX, LINUX, Solaris™, MacOS™, Windows™, etc. Any or all of program instructions 1025 may be provided as a computer program product, or software, that may include a non-transitory computer-readable storage medium having stored thereon instructions, which may be used to program a computer system (or other electronic devices) to perform a process according to various embodiments. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 1000 via I/O interface 1030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 1000 as system memory 1020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 1040.

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke and may define a particular application programming interface (API) to which other systems may be expected to conform when requesting the various operations.

In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A database system, comprising:
a global shared memory;
a one or more computing devices individually comprising at least one processor and a memory;
a plurality of processes organized into a plurality of query processing groups, wherein individual ones of the query processing groups respectfully comprise two or more processes of the plurality of processes, wherein individual ones of the plurality of processes are configured to:
allocate memory to a group-private shared memory arena from the global shared memory, wherein the group-private shared memory arena is allocated on behalf of a processing group from the plurality of query processing groups, the processing group comprising two or more processes of the plurality of processes;
detect an abnormal execution condition for a failing process of the processing group during execution of a query, and responsive to the detecting:
continue execution of other processes of the plurality of processes different from the two or more processes of the processing group while recovering execution of the processing group, wherein to recover execution of the processing group, the individual ones of the plurality of processes are configured to:
restore execution of the two or more processes of the processing group to a normal execution state; and
return the allocated memory of the group-private memory arena to the global shared memory.

2. The system of claim 1, wherein individual ones of the plurality of processing groups respectively comprise two or more processes having read-write access to group-private shared memory arenas and read-only access to a public shared memory arena.

3. The system of claim 1, wherein the failing process of the query processing group is a leader process, and wherein to restore execution of the two or more processes of the query processing group to the normal execution state, the individual ones of the plurality of processes are configured to:
abort the query at the two or more processes of the query processing group; and
restart the two or more processes of the processing group.

4. The system of claim 1, wherein the failing process of the query processing group is a compute process directed by a leader process of the query processing group, and wherein to restore execution of the two or more processes of the query processing group to the normal execution state, the individual ones of the plurality of processes are configured to:
send a message, from the failing process to the leader process, indicating the detected abnormal execution condition;
abort the query at the two or more processes of the query processing group; and
restart the failing process.

5. A method, comprising:
allocating memory to a group-private shared memory arena from a global shared memory of a computing system comprising a plurality of processes organized into a plurality of processing groups, wherein the group-private shared memory arena is allocated on behalf of a processing group from the plurality of processing groups, the processing group comprising two or more processes of the plurality of processes;
detecting an abnormal execution condition for a failing process of the processing group during execution of a processing job, and responsive to the detecting:
continuing execution of other processes of the plurality of processes different from the two or more processes of the processing group while recovering execution of the processing group, the recovering execution of the processing group comprising:
  restoring execution of the two or more processes of the processing group to a normal execution state; and
  returning the allocated memory of the group-private memory arena to the global shared memory.

6. The method of claim 5, wherein the plurality of processing groups respectively comprise processes having read-write access to group-private shared memory arenas and read-only access to a public shared memory arena.

7. The method of claim 6, further comprising:
  escalating privilege of a particular process of the processing group to obtain read-write access to the public shared memory arena;
  detecting an abnormal execution condition for the particular process while executing at the escalated privilege; and
  restarting the plurality of processes responsive to the detecting.

8. The method of claim 5, wherein the failing process of the processing group is a leader process, and wherein restoring execution of the two or more processes of the processing group to the normal execution state comprises:
  aborting the processing job at the two or more processes of the processing group; and
  restarting the two or more processes of the processing group.

9. The method of claim 5, wherein the failing process of the processing group is a compute process directed by a leader process of the processing group, and wherein restoring execution of the two or more processes of the processing group to the normal execution state comprises:
  sending a message, from the failing process to the leader process, indicating the detected abnormal execution condition;
  aborting the processing job at the two or more processes of the processing group; and
  restarting the failing process.

10. The method of claim 5, the recovering execution of the processing group further comprising:
  signaling, to a dedicated thread of the failing process, information describing the abnormal execution condition.

11. The method of claim 10, further comprising:
  determining, by the dedicated thread of the failing process, a recovery state for the abnormal execution condition according to one or more execution privileges of the failing process;
  restarting the plurality of processes of the computing system responsive to determining that the recovery state is an safe recovery state; and
  causing, by the dedicated thread of the failing process, the returning of the allocated memory and the restarting of the two or more processes of the processing group responsive to determining that the recovery state is a safe recovery state.

12. The method of claim 5, wherein the computing system is a computing cluster comprising a plurality of computing nodes, and wherein the processing group is one of a plurality of processing groups respectively providing query processing for a distributed database service.

13. One or more non-transitory computer-accessible storage media storing program instructions that when executed on or across one or more computing devices cause the one or more computing devices to perform:
  allocating memory to a group-private shared memory arena from a global shared memory of a computing system comprising a plurality of processes organized into a plurality of query processing groups, wherein the group-private shared memory arena is allocated on behalf of a processing group from the plurality of processing groups, the processing group comprising two or more processes of the plurality of processes;
  detecting an abnormal execution condition for a failing process of the processing group during execution of a processing job, and responsive to the detecting:
    continuing execution of other processes of the plurality of processes different from the two or more processes of the processing group while recovering execution of the processing group, the recovering execution of the processing group comprising:
      restoring execution of the two or more processes of the processing group to a normal execution state; and
      returning the allocated memory of the group-private memory arena to the global shared memory.

14. The one or more non-transitory computer-accessible storage media of claim 13, wherein the processing group is one of a plurality of processing groups respectively comprising processes having read-write access to group-private shared memory arenas and read-only access to a public shared memory arena.

15. The one or more non-transitory computer-accessible storage media of claim 13, the program instructions that when executed on or across one or more computing devices cause the one or more computing devices to further perform:
  escalating privilege of a particular process of the processing group to obtain read-write access to the public shared memory area;
  detecting an abnormal execution condition for the particular process while executing at the escalated privilege; and
  restarting the plurality of processes responsive to the detecting.

16. The one or more non-transitory computer-accessible storage media of claim 13, wherein the failing process of the processing group is a leader process, and wherein restoring execution of the two or more processes of the processing group to the normal execution state comprises:
  canceling the processing job at the two or more processes of the processing group; and
  restarting the two or more processes of the processing group.

17. The one or more non-transitory computer-accessible storage media of claim 13, wherein the failing process of the processing group is a compute process directed by a leader process of the processing group, and wherein restoring execution of the two or more processes of the processing group to the normal execution state comprises:
  sending a message, from the failing process to the leader process, indicating the detected abnormal execution condition;
  canceling the processing job at the two or more processes of the processing group; and
  restarting the failing process.

18. The one or more non-transitory computer-accessible storage media of claim 13, the recovering execution of the processing group further comprising:
  signaling, to a dedicated thread of the failing process, information describing the abnormal execution condition; and causing, by the dedicated thread of the failing process, the returning of the allocated memory and the restarting of the two or more processes of the processing group.

19. The one or more non-transitory computer-accessible storage media of claim 13, the program instructions that when executed on or across one or more computing devices cause the one or more computing devices to further perform:
   determining, by the dedicated thread of the failing process, a recovery state for the abnormal execution condition according to one or more execution privileges of the failing process;
   restarting the plurality of processes of the computing system responsive to determining that the recovery state is an safe recovery state; and
   causing, by the dedicated thread of the failing process, the returning of the allocated memory and the restarting of the two or more processes of the processing group responsive to determining that the recovery state is a safe recovery state.

20. The one or more non-transitory computer-accessible storage media of claim 13, wherein the computing system is a computing cluster comprising a plurality of computing nodes, and wherein the processing group is one of a plurality of processing groups respectively providing query processing for a distributed database service.

* * * * *